United States Patent [19]

Ficker

[11] Patent Number: 5,166,268

[45] Date of Patent: Nov. 24, 1992

[54] PROCESS FOR COLD FORMING PROPYLENE COPOLYMERS

[75] Inventor: Harold K. Ficker, Wayne, N.J.

[73] Assignee: Union Carbide Chemicals & Plastics Technology Corporation, Danbury, Conn.

[21] Appl. No.: 507,784

[22] Filed: Apr. 12, 1990

[51] Int. Cl.[5] .............. C08L 23/10; C08L 23/16; C08J 5/00

[52] U.S. Cl. .................. 525/198; 525/322; 525/240; 264/331.17

[58] Field of Search .............. 525/198, 322, 240; 264/331.17

[56] References Cited

U.S. PATENT DOCUMENTS

| | | | |
|---|---|---|---|
| 4,036,912 | 7/1977 | Stricharczuk | 525/211 |
| 4,634,740 | 1/1987 | Fujita et al. | 525/240 |
| 4,882,380 | 11/1989 | Ficker et al. | 525/323 |
| 5,028,663 | 7/1991 | Chung | 525/198 |

Primary Examiner—Carman J. Seccuro, Jr.
Attorney, Agent, or Firm—Saul R. Bresch

[57] ABSTRACT

A process for the solid phase forming of an impact polypropylene copolymer comprising (a) providing an impact polypropylene copolymer comprising (i) a matrix, which is either a homopolymer of propylene or a copolymer of propylene and up to about 5 percent by weight of at least one other alpha-olefin based on the weight of the copolymer, and, incorporated into said matrix, (ii) a copolymer of ethylene and at least one other alpha-olefin, said copolymer having a crystallinity of at least about 20 percent and being present in the impact copolymer in an amount of at least about 10 percent by weight based on the total weight of the impact copolymer; and (b) forming the impact polypropylene copolymer at a temperature above the melting point of component (ii) but below the melting point of component (i).

9 Claims, No Drawings

PROCESS FOR COLD FORMING PROPYLENE COPOLYMERS

TECHNICAL FIELD

This invention relates to a process for cold forming propylene copolymers.

BACKGROUND INFORMATION

Cold forming (or solid phase forming) is commonly used to fabricate finished articles from sheet or other fabricated preforms at temperatures below the melting point of the preform material. A common example is the stamping of steel sheet to produce automobile body components. The same process is used commercially to finish polymers such as polypropylene and/or impact polypropylene copolymers.

The major problem associated with the cold forming or stamping of polymers is the tendency of a formed part to return to its original shape over time, especially when subjected to elevated temperatures. This is obviously undesirable since the desired part geometry is altered. Two other problems associated with the cold forming of polymers is (i) uneven deformation during forming resulting in variations in wall thickness or, in severe instances, tearing of the preform material, and (ii) poor definition of formed part details.

These problems may be alleviated by performing the forming operation at elevated temperatures just below the melting point of the polymer. However, at these high temperatures, the polymer often becomes difficult to handle. In the case of sheet, sagging or deformation under its own weight is a problem. A further drawback is that precise temperature control is required at the higher temperatures. Use of high temperatures also necessitates longer cycle times. Thus, it is desirable to form polymer well below its melting point.

DISCLOSURE OF THE INVENTION

An object of this invention, therefore, is to provide a process for the forming of impact polypropylene copolymer at temperatures below its melting point, which gives rise to a dimensionally stable and evenly formed product of good definition. Other objects and advantages will become apparent hereinafter.

According to the present invention, the above object is met by a process for the manufacture of a shaped article which comprises cold forming an impact copolymer composition comprised of:

a. at least ten percent (10%) by weight of the total composition of an interpolymer of ethylene and one or more other alpha-olefins, having a crystallinity of at least about twenty percent (20%), incorporated into:

b. a matrix which is either a homopolymer of propylene or an interpolymer of propylene and one or more other alpha olefins;

at a temperature above the melting point of said interpolymer of ethylene and below the melting point of said homopolymer or interpolymer of propylene.

DESCRIPTION OF THE PREFERRED EMBODIMENT(S)

For applications requiring a high level of low temperature impact strength, so-called "impact polypropylene copolymers" are used. These polypropylene copolymers are usually manufactured by the incorporation of an elastomeric impact modifier, e.g., an ethylene/propylene copolymer rubber (EPR), into a homopolymer matrix either by blending the homopolymer with the EPR or by producing the copolymer in-situ.

A typical process for the preparation of impact polypropylene copolymers comprises the following steps:

(a) contacting a sufficient amount of propylene or propylene and at least one other alpha-olefin, preferably having 2 or 4 to 8 carbon atoms, to provide a copolymer having up to about 5 percent by weight of the other alpha-olefin based on the weight of the copolymer, and hydrogen, under polymerization conditions, with a catalyst comprising (i) a catalyst precursor, which includes titanium, magnesium, chlorine, and an electron donor; (ii) a hydrocarbylaluminum cocatalyst; and (iii) a selectivity control agent, which is different from the electron donor, in a first reactor in such a manner that a mixture of a homopolymer of propylene or a copolymer of propylene and alpha-olefin together with active catalyst is produced;

(b) passing the mixture from step (a) into a second reactor; and (c) adding to the second reactor:

a sufficient amount of ethylene and at least one other alpha-olefin, preferably alpha-olefins having 3 to 8 carbon atoms, to provide an ethylene/alpha-olefin copolymer having an ethylene content of at least about 85 percent by weight based on the weight of the copolymer, and hydrogen.

The process steps and conditions and the catalyst used in each reactor can be the same as those described in U.S. Pat. No. 4,414,132 or U.S. patent application Ser. No. 051,853 filed on May 19, 1987, and the reactors are preferably gas phase reactors such as the fluidized bed reactor described in U.S. Pat. No. 4,482,687.

The atomic or mole ratios of catalyst components are generally as follows:

| Ratio | Broad Range | Preferred Range |
| --- | --- | --- |
| Mg to Ti | 1:1 to 50:1 | 3:1 to 30:1 |
| Cl to Mg | 1:1 to 5:1 | 2:1 to 3:1 |
| Mg to electron donor | 0.1:1 to 100:1 | 1:1 to 60:1 |
| Cocatalyst to Ti | 5:1 to 300:1 | 20:1 to 100:1 |
| Cocatalyst to selectivity control agent | 0.1:1 to 100:1 | 0.2:1 to 50:1 |

The polymerization can be conducted using gas phase, slurry, or solution processes; however, the polymerization in the second reactor is preferably carried out in the gas phase. For gas phase polymerizations, fluidized bed reactors are the reactors of choice. With respect to fluidized bed reactors, U.S. Pat. No. 4,482,687 is mentioned above.

The fluidized bed reactors are generally operated at a temperature in the range of about 40° C. to about 150° C. and preferably about 60° C. to about 120° C. and a pressure of about 50 psig to about 700 psig and preferably about 250 psig to about 550 psig. The velocity of the fluidizing gas can be in the range of about 0.1 to about 3.0 feet per second and is preferably about 0.5 to about 2.0 feet per second. The weight flow ratio of monomer to catalyst in the first reactor can be about 1000:1 to about 100,000:1 and is preferably about 10,000:1 to about 100,000:1.

As noted above, propylene or a mixture of propylene and at least one alpha-olefin are introduced together with hydrogen and catalyst into the first reactor. The alpha-olefin components can be, for example, ethylene, 1-butene, 1-hexene, 4-methyl-1-pentene, or 1-octene, or various mixtures of alpha-olefins. The mole ratio of alpha-olefin to propylene can be about 0.01 to about 0.06 and, preferably, is about 0.015 to about 0.04. The mole ratio of hydrogen to propylene alone or combined propylene and alpha-olefin can be in the range of about 0.001 to about 0.45 and is preferably about 0.004 to about 0.1. In the case of propylene and alpha-olefin, sufficient amounts of comonomers are used to provide a copolymer having up to about 5 percent by weight alpha-olefin based on the weight of the copolymer, and preferably about 0.1 to about 2 percent by weight alpha-olefin.

The combination of components and conditions, previously mentioned, leads to a mixture of homopolymer or copolymer of propylene together with active catalyst embedded in the polymer matrix. This mixture from the first reactor is transferred to the second reactor to which additional catalyst, cocatalyst, and selectivity control agent can be added although it is preferred that only cocatalyst be added to the second reactor. For some catalysts, none of these three components need be added.

In the second reactor, ethylene and alpha-olefin, usually propylene can be introduced in a mole ratio of about 10 to about 100 moles of ethylene per mole of alpha-olefin, i.e., total alpha-olefin other than ethylene. A preferred ratio is in the range of about 10 to about 50 moles of ethylene per mole of alpha-olefin. The goal is to provide a copolymer of ethylene containing at least about 85 percent by weight ethylene based on the weight of the copolymer and preferably about 90 to about 99 percent ethylene, and having a crystallinity in the range of about 20 to about 60 percent, preferably about 35 to about 50 percent. The percent crystallinity attributed to the copolymer fraction can be calculated from the weight fraction of second reactor product and the measured heat of fusion required to melt the copolymer fraction as determined by differential scanning calorimetry (DSC). The combined ethylene/alpha-olefin addition is preferably sufficient to provide a copolymer fraction of about 10 to about 50 percent by weight of copolymer based on the weight of the product, and most preferably a copolymer fraction of about 20 to about 35 percent by weight. Hydrogen is also introduced into the second reactor together with the ethylene and alpha-olefin. The mole ratio of hydrogen to combined ethylene and alpha-olefin is about 0.1 to about 1.0 and is preferably about 0.1 to about 0.4. It should be noted that some or all of the alpha-olefin in the second reactor can come from the first reactor. The two reactors are operated continuously, in series. The product is an ethylene/alpha-olefin copolymer incorporated into a matrix of propylene homopolymer or copolymer.

The introduction of alpha-olefin comonomer into the first reactor results in final products with somewhat lower stiffness (flexural modulus), but with some gain in Izod impact strength.

The impact polypropylene copolymer product can be processed into suitable preforms by any of the widely known polymer processing methods including injection molding, extrusion, and compression molding. The preform can have any suitable geometry dictated by the finished part. As an example, cups or trays may be fabricated from sheet stock prepared by the extrusion process. The polymer processing methods are widely known and described by the literature. A summary of injection molding, extrusion, and compression molding processes can be found in the Modern Plastics Encyclopedia-1988 published by McGraw-Hill (1987), pages 226 to 250.

Subject process can be, alternatively, described as the solid phase forming of an impact polypropylene copolymer comprising (a) providing an impact polypropylene copolymer comprising (i) a matrix, which is either a homopolymer of propylene or a copolymer of propylene and up to about 5 percent by weight at least one other alpha-olefin based on the weight of the copolymer and, incorporated into said matrix, (ii) a copolymer of ethylene and at least one other alpha-olefin, said copolymer having a crystallinity of at least about 20 percent and being present in the impact copolymer in an amount of at least about 10 percent by weight based on the weight of the impact copolymer; and (b) forming said impact polypropylene copolymer at a temperature above the melting point of component (ii) but below the melting point of component (i).

The terms "cold forming" or "solid phase forming" are meant to be generic and to include widely known and used manufacturing methods whose common denominator is that polymer deformation or shaping into a finished part is accomplished below the polymer melting point. These processes include solid phase pressure forming, forging, stamping, roll forming, and coining. Process descriptions and typical forming temperatures of a variety of thermoplastic materials can be found in the SPE Journal, October 1969, Volume 25, pages 46 to 52.

The cold forming is carried out at a temperature above the melting point of the ethylene/alpha-olefin copolymer prepared in the second reactor and below the melting point of the matrix, i.e., the homopolymer or copolymer of propylene prepared in the first reactor. A typical low temperature is the range of about 130° to about 135° C. and a typical high temperature is in the range of about 145° to about 155° C.

The patents, patent application and other publications mentioned in this specification are incorporated by reference herein.

The invention is illustrated by the following examples.

EXAMPLES 1 TO 3

ASTM Type I tensile bars are prepared from the following polymers:

Example 1: a homopolymer of propylene

Example 2: a conventional impact polypropylene copolymer

Example 3: an impact polypropylene copolymer for use in the invention

In examples 2 and 3 the matrix is a homopolymer of propylene and the copolymer incorporated into the matrix is an ethylene/ propylene copolymer. A typical process for preparing the impact copolymers is described above.

The tensile bars are prepared by injection molding the polypropylene at a melt temperature of 440° to 460° F. The bars measure 8 inches in length, ⅛ inch in thickness, and ¾ inch in maximum width. They are heated in a circulatory air oven at 140° C. and are then manually wrapped around a 1.5 inch steel mandrel to simulate a forming operation.

After one day of aging, the coil diameter (inside measurement) is examined. The example 1 and example 2 polymers distort significantly from the formed dimension. The example 3 polymer has nearly the same configuration as when originally formed attesting to the superior dimensional stability of the so formed polymer.

Variables and results are shown in the following table.

TABLE

| Example | 1 | 2 | 3 |
|---|---|---|---|
| Melt Flow (dg/min) | 3.6 | 1.8 | 3.4 |
| Secant Flexural Modulus (psi) | 207,000 | 110,000 | 150,000 |
| Tensile Yield Strength (psi) | 4,400 | 2,910 | 4,300 |
| Copolymer Fraction (%) | 0 | 25 | 23 |
| Ethylene in Copolymer Fraction (%) | — | 60 | 95 |
| DSC Melting Point | | | |
| PE (°C.) | none | 118 | 128 |
| PP (°C.) | 160 | 159 | 153 |
| DSC Delta H (Heat of Fusion) | | | |
| PE (cal/g) | 0 | 0.05 | 6.6 |
| PP (cal/g) | 23.0 | 17.3 | 14.7 |
| PE Delta H Fusion (% of Total) | 0 | 2.8 | 31 |
| Crystallinity of Copolymer Fraction (%) | 0 | 0.3 | 40 |
| Diameter of formed part (Inches) | 2.3 | 2.9 | 1.6 |
| Recovery % | 53 | 93 | 7 |

Notes to Table:
1. Melt flow is determined under ASTM D1238, Condition L at 230° C. and 2.16 kilogram load. The results are given in decigrams per minute.
2. Secant Flexural modulus is determined under ASTM D790, Method A. The results are given in pounds per square inch.
3. Tensile yield strength is determined under ASTM D638; draw rate = 2 inches per minute. The results are given in pounds per square inch.
4. Copolymer fraction is the percentage of ethylene/propylene copolymer incorporated into the matrix based on the total weight of copolymer and matrix.
5. Ethylene in copolymer fraction is the percentage of ethylene in the ethylene/propylene copolymer incorporated into the matrix based on the weight of the ethylene/propylene copolymer.
6/7. The DSC melting point for the polyethylene crystalline fraction of the ethylene/propylene copolymer (PE) and the polypropylene crystalline fraction of the same copolymer (PP) is given in degrees Centigrade. The DSC delta H (Heat of Fusion) for PE and PP is given in calories per gram. The PE value stands for the endotherm peak associated with the melting of the polyethylene crystalline fraction. The PP value stands for the endotherm peak associated with the melting of the polypropylene crystalline fraction. The DSC delta H PE represents the energy required to melt the polyethylene crystalline fraction and the DSC delta H PP represents the energy required to melt the polypropylene crystalline fraction. The values are determined under ASTM D3417 and D3418.
8. The PE delta H fusion (% of total) is the heat of fusion due to ethylene crystallinity as measured by Differential Scanning Colorimetry (DSC). The value is given as a percentage of the total heat of fusion. It is noted that polyethylene crystallinity melts in the 100° C. to 135° C. region. Propylene crystallinity, on the other hand, melts in the 150° C. to 170° C. region. The selected temperature of 140° C. is above the melting point of the ethylene/propylene copolymer, but below the melting point of the polypropylene matrix. The Delta H of Fusion of the ethylene/propylene copolymer is proportional to the polyethylene crystallinity and the Delta H of Fusion of the matrix is proportional to the melting point of the polyprppylene crystallinity.
9. The diameter of the formed part is measured in inches.
10. The recovery represents the percentage of change in diameter from the original diameter of the part as formed to the present diameter of the formed part after aging for 24 hours. The percentage is based on the original diameter.

I claim:

1. A process for the manufacture of a shaped article which comprises cold forming an impact copolymer composition comprised of:
    a. at least ten percent (10%) by weight of the total composition of an interpolymer of at least about 85 percent by weight ethylene and one or more other alpha-olefins, having a crystallinity of at least about twenty percent (20%), incorporated, via in situ polymerization, into:
    b. a matrix which is either a of propylene or an interpolymer of propylene and to about 15 percent by weight of one or more other alpha olefins;
at a temperature above the melting point of said interpolymer of ethylene and below the melting point of said homopolymer or interpolymer of propylene.

2. The process defined in claim 1 wherein component (a) contains at least about 90 percent by weight ethylene.

3. The process defined in claim 1 wherein component (a) has a crystallinity in the range of about 20 to about 60 percent by weight.

4. The process defined in claim 1 wherein component (a) is present in the impact polypropylene copolymer in an amount of about 10 to about 50 percent by weight based on the weight of the impact polypropylene copolymer.

5. The process defined in claim 1 wherein one of the other alpha-olefins of component (a) is propylene.

6. The process defined in claim 1 wherein the forming is accomplished at a temperature in the range of about 130° C. to about 145° C.

7. The process defined in claim 1 wherein component (b) is a homopolymer of propylene.

8. The process defined in claim 1 wherein component (b) is a copolymer of propylene and ethylene.

9. A process for the solid phase forming of an impact polypropylene copolymer comprising (a) providing an impact polypropylene copolymer comprising (i) a matrix, which is either a homopolymer of propylene or a copolymer of propylene and up to about 2 percent by weight of at least one other alpha-olefin based on the weight of the copolymer and, incorporated, via in situ polymerization, into said matrix, (ii) a copolymer of at least about 85 percent by weight ethylene and at least one other alpha-olefin, said copolymer having a crystallinity of at least about 20 percent and being present in the impact copolymer in an amount of at least about 10 percent by weight based on the weight of the impact copolymer; and (b) forming said impact polypropylene copolymer at a temperature above the melting point of component (ii) but below the melting point of component (i).

* * * * *

UNITED STATES PATENT AND TRADEMARK OFFICE
CERTIFICATE OF CORRECTION

PATENT NO. : 5,166,268
DATED : November 24, 1992
INVENTOR(S) : Harold K. Ficker

It is certified that error appears in the above-identified patent and that said Letters Patent is hereby corrected as shown below:

Column 6, line 16, before "of propylene", insert --homopolymer--;
line 17, change "to about 15" to --up to about 5--.

Signed and Sealed this

Twenty-sixth Day of October, 1993

Attest:

BRUCE LEHMAN

*Attesting Officer*  *Commissioner of Patents and Trademarks*